Patented June 13, 1950

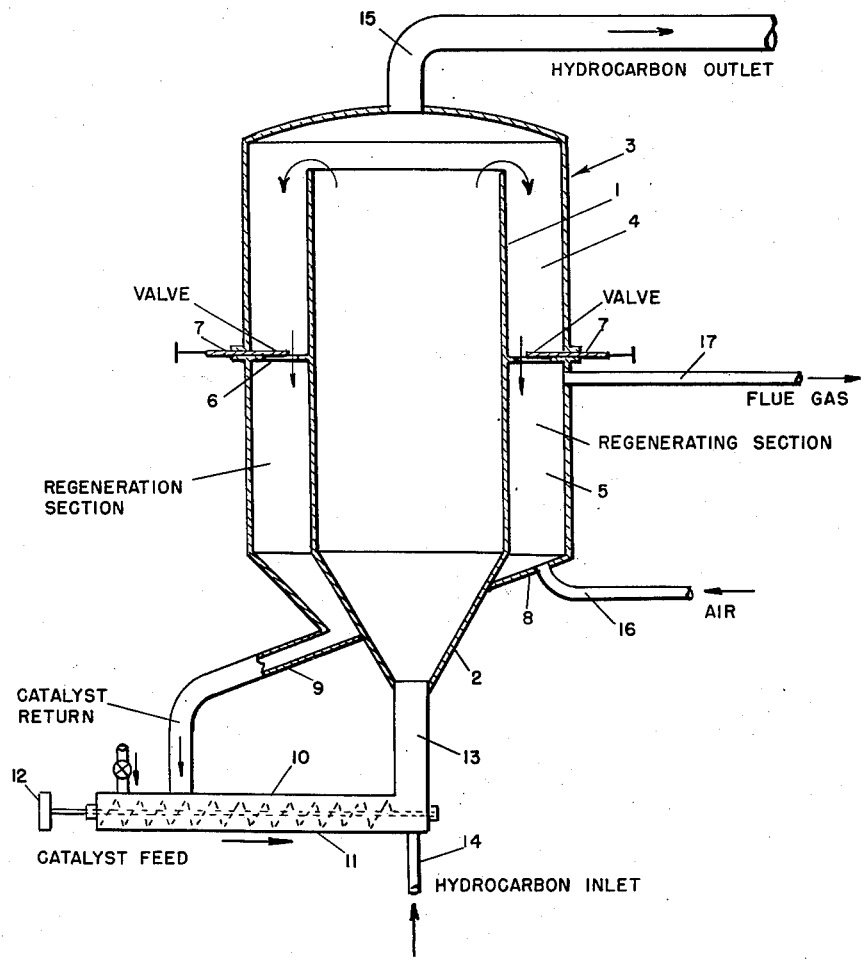

2,511,652

UNITED STATES PATENT OFFICE 2,511,652

APPARATUS FOR THE CATALYTIC CONVERSION OF HYDROCARBONS

Edwin W. Shand, Homewood, Ill., assignor to Sinclair Refining Company, New York, N. Y., a corporation of Maine Application June 3, 1947, Serial No. 752,239

2 Claims. (Cl. 23—288)

This invention relates to the pyrolytic conversion of hydrocarbons and more particularly apparatus adapted to carry on pyrolytic conversion processes involving the use of catalysts.

In the conversion of hydrocarbon base stocks to produce products having desired properties, such as high octane number for use in gasoline, the stock is subjected to one of several processes, such as cracking, hydrogenation, dehydrogenation, etc., in the presence of the catalyst adsorbed on a carrier.

After such catalysts have been in use for a period of time, they must be regenerated by removing the carbon which becomes deposited on the catalyst in use. This is generally accomplished by burning the carbon deposit from the catalyst which results in the liberation of heat.

An object of the present invention is the provision of means for carrying out conversion processes in which the heat of the spent catalyst and the heat liberated in the regeneration of the catalyst is more effectively employed to maintain the desired temperature in the reactor or converter in which the conversion operation is performed. The invention contemplates the delivery of charge oil and fresh or regenerated catalyst to the bottom of a reactor or converter, the continuous feed of fresh or regenerated catalyst to the bottom of the chamber thereby forcing the catalyst in the chamber upwardly and means for delivering the catalyst from the top of the chamber, at which time it is ready for regeneration, in such manner that the heat then contained in the catalyst and the heat created in the regeneration of the catalyst can be employed for heating the chamber. The treated stock passes through the catalyst bed to an outlet at the top whence it is conveyed to condensers, stabilizers, separators or fractionators or other apparatus.

The catalyst, moving upwardly in the chamber, overflows into an annular space surrounding the reactor. In the upper part of this annular chamber the catalyst freshly discharged from the reactor, being hot, helps to maintain the desired heat conditions in the reactor. The catalyst moves downwardly in the annular space by gravity. The lower portion of the annular space, which is separated from the upper portion by suitable valve mechanism, forms the regenerating chamber and means are provided for delivering air thereto and removing flue gases therefrom. The regeneration of the catalyst supplies heat which also serves to maintain the required temperature in the reactor. From the regenerator the catalyst may be returned by suitable means, such as a screw conveyor to the bottom of the reactor.

In the accompanying drawing I have illustrated one form of apparatus suitable for use in practicing the invention.

In the drawing the figure is a vertical section illustrating, more or less diagrammatically, the practice of the invention.

Referring to the drawing, I provide an inner chamber 1 shown as circular but which may be of any suitable shape which is adapted to contain the catalyst substantially filling the entire chamber. The bottom of the chamber is preferably tapered or funnel shaped as indicated at 2. A second chamber 3 surrounds the chamber 1, the second chamber being divided into an upper portion 4 and a lower portion 5 by a partition 6. Suitable valve means 7 may control communication between the chambers 4 and 5.

The lower chamber 5 which is the catalyst regenerating chamber, is provided with a sloping bottom 8 and an outlet pipe 9 is connected to the lowest point of the bottom 8. This pipe communicates with a conveyor consisting of a cylindrical casing 10 and a shaft carrying a screw 11, the shaft and the screw of the conveyor being rotated by any suitable means. For purposes of illustration, I have indicated a pulley 12 on the shaft which may receive a belt from any suitable source of power. The outlet end of the conveyor communicates with a pipe 13 extending into the funnel-shaped bottom of the chamber 1.

An inlet pipe 14 for the stock to be treated communicates with the bottom of the pipe 13 and an outlet pipe 15 for the treated stock communicates with the top of the chamber. The catalyst regenerating chamber is provided with an inlet pipe 16 for air and an outlet pipe 17 for flue gases.

In practicing the process the chamber 1 is filled with fresh catalyst and brought to the temperature necessary for the particular conversion process to be performed. Sufficient additional catalyst is fed to the conveyor 10 and thence to the bottom of the chamber 1 to cause the catalyst in the top of the chamber 1 to overflow into the annular space 4. Periodically, the catalyst contained in the space 4 is delivered to the regenerating chamber 5 by opening the valves 7. Air is then delivered to the regenerating chamber through pipe 16 and flue gases discharged therefrom through pipe 17. The stock to be treated is delivered to the reactor through pipe 14. It passes up through the bed of catalyst wherein the desired conversion operation is performed and is discharged through outlet pipe 15. From pipe 15 the treated stock is delivered to fractionators, separators or other apparatus depending upon the particular conversion process being performed.

While the process is in operation catalyst may be continuously fed to the bottom of the chamber 1 and it continuously overflows from the top of the chamber into the annular space 4. The rate of feed may be regulated, according to the particular catalyst being used, so that the time of travel through the chamber 1 is the time that such catalyst is normally used prior to regeneration. The catalyst material overflowing into chamber 4 is thus in condition for regeneration at the time that it is automatically fed from the reactor. With the continuous feed of catalyst from chamber 4 to the regenerating chamber 5, the valves 7 are maintained in open position. Admixture of flue gases with the hydrocarbon vapors in the upper part of the reactor may be prevented by proper balancing of pressures. A pressure of from 5 to 25 lbs. per sq. inch may be maintained in the top of the reactor and valves 7 kept open without admixture of the flue gases and the stock, by maintaining substantially the same pressure, or a slightly lower pressure in chamber 5.

Valves 7 may be normally closed and periodically, when a quantity of catalyst has accumulated in the chamber 4, the valves 7 opened to deliver catalyst to the regenerating chamber 5. Passage of flue gases into the chamber 4 and thence to the regenerator may be prevented by using double valves, or by discontinuing delivery of air through pipe 16, while valves 7 are open.

Air, at the necessary temperatures for regeneration of the catalyst, is delivered to the regenerating chamber, through pipe 16. The carbon is thus burned off of the catalyst and a portion of the heat created passes through the wall of the reactor chamber to heat the catalyst bed in the chamber. From the chamber 5 the catalyst flows through pipe 9 to the conveyor 10. The conveyor 10 delivers the regenerated catalyst to the bottom of the reactor through pipe 13 and this feed of the catalyst into the bottom of the regenerator moves the catalyst bed upwardly and causes the catalyst at the top to overflow into the chamber 4.

The invention may be employed in any of the conversion processes using any of the known catalyst in which the catalyst is in granular or pellet form or in which the catalyst is in the form of a metal or metal oxide coating on granules or pellets of porous materials such as silica clays, diatomaceous earth or the like.

I claim:

1. Apparatus for use in the conversion of hydrocarbons in the presence of a catalyst and for regenerating the catalyst comprising a vertically elongated conversion chamber adapted to be filled with a granular catalyst, an outer chamber surrounding the first said chamber, the inner chamber opening at its upper end into the outer chamber, a mechanical conveyor connected at its outlet end with the lower end of the inner chamber and adapted forcefully to feed catalyst thereto, a conduit leading from a lower zone of the outer chamber to the inlet end of the conveyor, an inlet for passing the hydrocarbon charge oil into the lower end of the inner chamber, an outlet for withdrawing products of the conversion from the upper end of the outer chamber, and conduit means for passing air into and for withdrawing flue gas from the outer chamber.

2. Apparatus for use in the conversion of hydrocarbons in the presence of a catalyst and for regenerating the catalyst comprising a vertically elongated conversion chamber adapted to be filled with a granular catalyst, an outer chamber surrounding the first said chamber and divided into an upper and lower zone, the inner chamber opening at its upper end into the upper zone of the outer chamber, a passageway connecting the upper zone with the lower zone of the outer chamber, valve means so constructed and arranged as to regulate the size of and to close the passageway, a mechanical conveyor connected at its outlet end with the lower end of the inner chamber and adapted forcefully to feed catalyst thereto, a conduit leading from the lower zone of the outer chamber to the inlet end of the conveyor, an inlet for passing hydrocarbon charge oil to the lower end of the inner chamber, an outlet for withdrawing products of the conversion from the upper end of the outer chamber, an inlet for regenerating gas at the lower end and an outlet for flue gas at the upper end of the lower zone of the outer chamber.

EDWIN W. SHAND.

REFERENCES CITED

The following references are of record in the file of this patent:

UNITED STATES PATENTS

| Number | Name | Date |
|---|---|---|
| 2,337,684 | Scheineman | Dec. 28, 1943 |
| 2,378,342 | Voorhees et al. | June 12, 1945 |
| 2,394,710 | McAfee | Feb. 12, 1946 |